US011881390B2

(12) United States Patent
Thibault

(10) Patent No.: US 11,881,390 B2
(45) Date of Patent: Jan. 23, 2024

(54) ELECTRODELESS PLASMA DEVICE

(71) Applicant: Pierre F Thibault, Boucherville (CA)

(72) Inventor: Pierre F Thibault, Boucherville (CA)

( * ) Notice: Subject to any disclaimer, the term of this patent is extended or adjusted under 35 U.S.C. 154(b) by 0 days.

(21) Appl. No.: 18/012,146

(22) PCT Filed: Jun. 21, 2021

(86) PCT No.: PCT/CA2021/050845
§ 371 (c)(1),
(2) Date: Dec. 21, 2022

(87) PCT Pub. No.: WO2021/258194
PCT Pub. Date: Dec. 30, 2021

(65) Prior Publication Data

US 2023/0274927 A1 Aug. 31, 2023

Related U.S. Application Data

(60) Provisional application No. 63/043,938, filed on Jun. 25, 2020.

(51) Int. Cl.
*H01J 5/04* (2006.01)
*H01J 61/34* (2006.01)
*H01J 65/04* (2006.01)

(52) U.S. Cl.
CPC ............ *H01J 65/048* (2013.01); *H01J 61/34* (2013.01)

(58) Field of Classification Search
CPC ................................ H01J 65/048; H01J 61/34
See application file for complete search history.

(56) References Cited

U.S. PATENT DOCUMENTS 4,864,194 A * 9/1989 Kobayashi ....... G03G 15/04036 313/488
7,566,890 B2 7/2009 Briggs et al.
7,993,528 B2 8/2011 NeCamp
8,405,046 B2 3/2013 NeCamp

FOREIGN PATENT DOCUMENTS

TW 201422538 A 6/2014

OTHER PUBLICATIONS

International Search Report issued on corresponding PCT Application No. PCT/CA2021/050845 dated Sep. 8, 2021.
Written Opinion issued on corresponding PCT Application No. PCT/CA2021/050845 dated Sep. 8, 2021.

* cited by examiner

*Primary Examiner* — Mary Ellen Bowman
(74) *Attorney, Agent, or Firm* — MBM Intellectual Property Law LLP

(57) ABSTRACT

A closed loop tubular discharge assembly for an electrodeless light-emitting device and discharge reactor is disclosed. The discharge assembly comprises one or more tubular segments tubularly connected at their respective ends to form the closed loop tubular assembly, which hermetically encloses an ionizable gas. At least one of the one or more tubular segments forms a non-cylindrical, hollow-shaped tubular segment. In one embodiment, the non-cylindrical, hollow-shaped segment is formed by an internal tube at least partially enclosed within an external tube, forming a hollow-shaped discharge envelope enclosing the ionizable gas there between. When a discharge current circulates in the ionizable gas of the envelope, a hollow-shaped plasma is created in the envelope and surrounds the internal tube. This design has been shown to increase performance and provide several improvements over prior art devices.

7 Claims, 18 Drawing Sheets

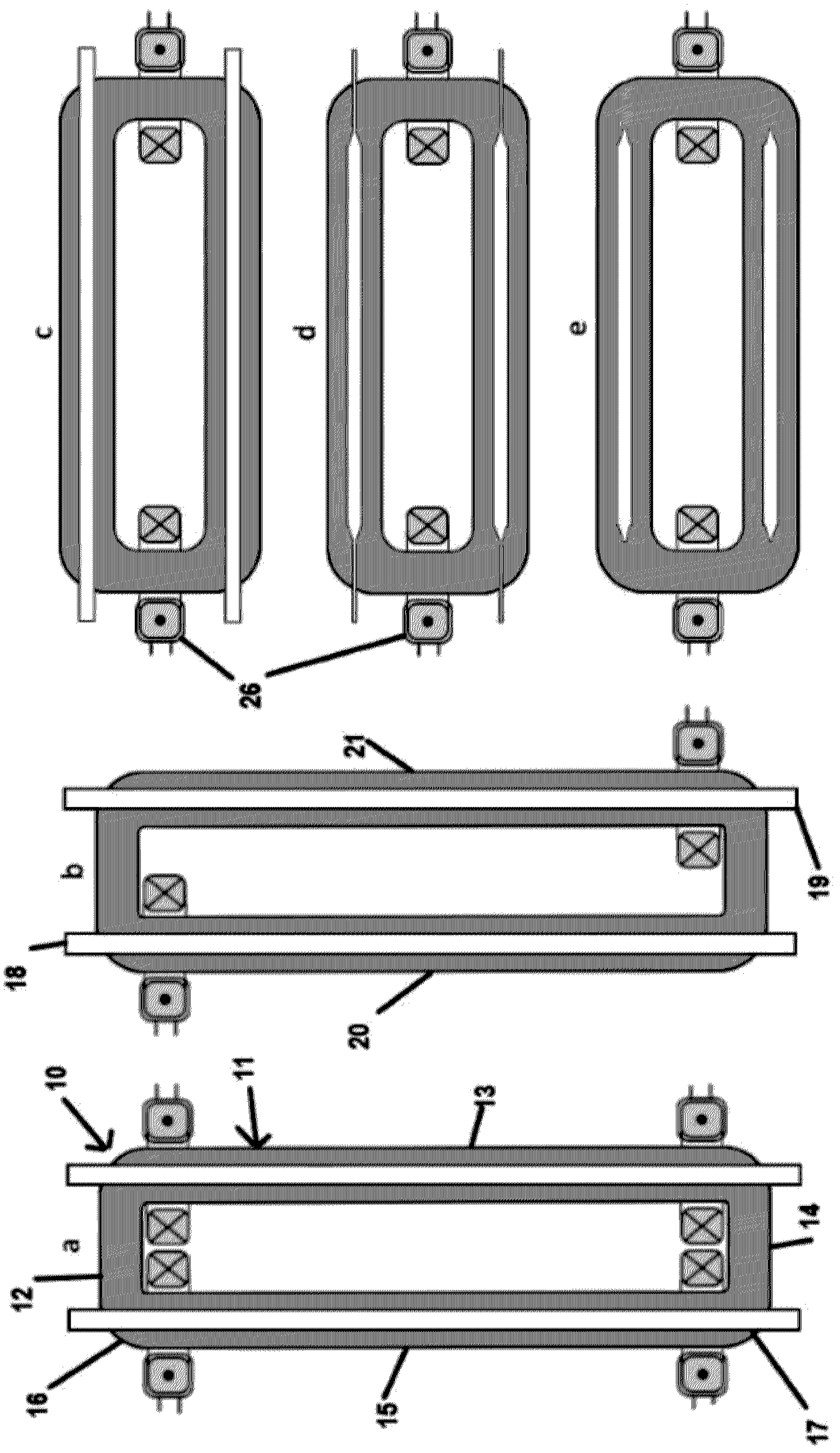
FIG. 1 a-e

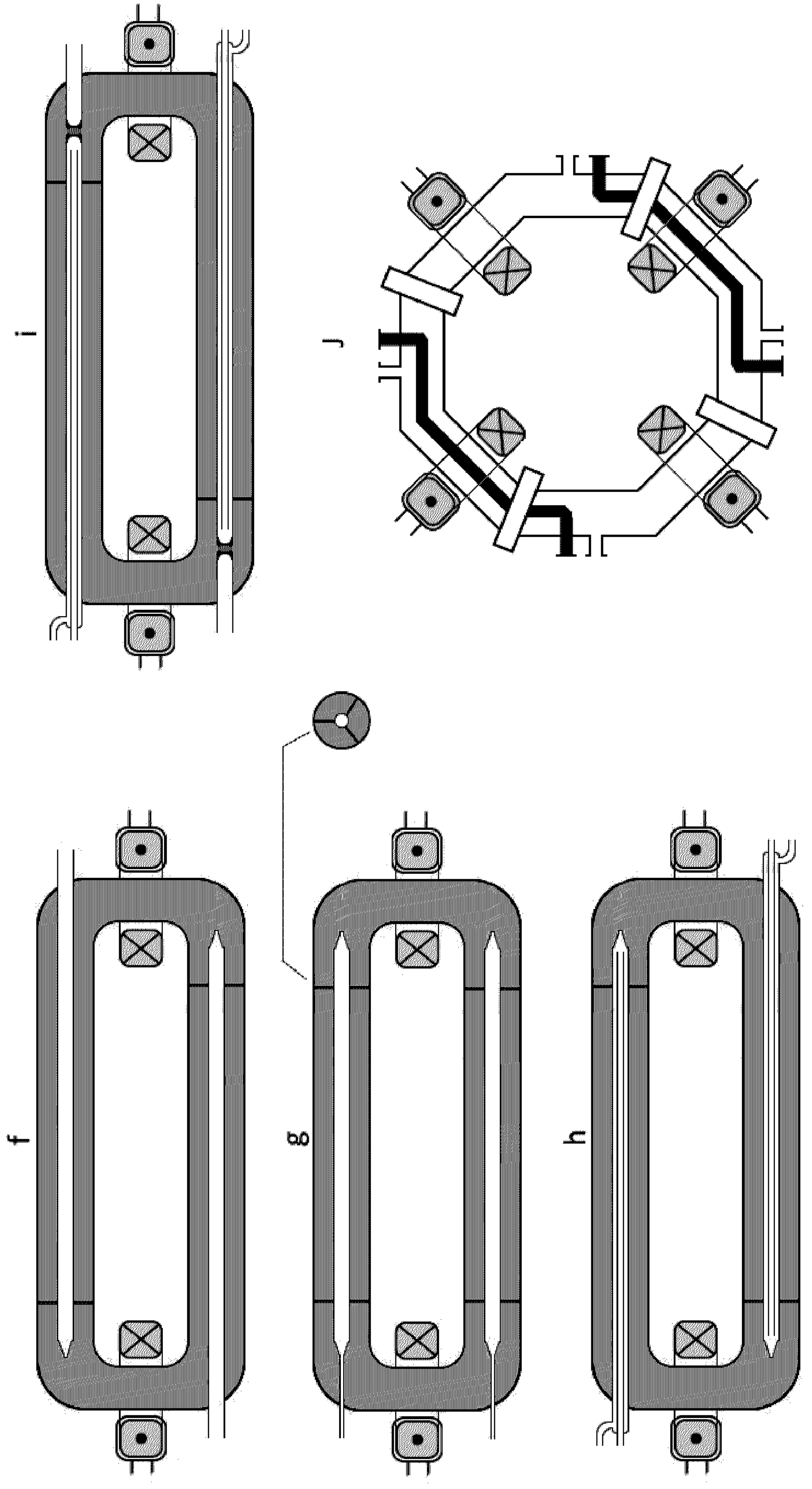
FIG. 1 f-j

PRIOR ART

Voltage Gain characteristics before ignition

Voltage Gain characteristics after ignition

PRIOR ART
(a)
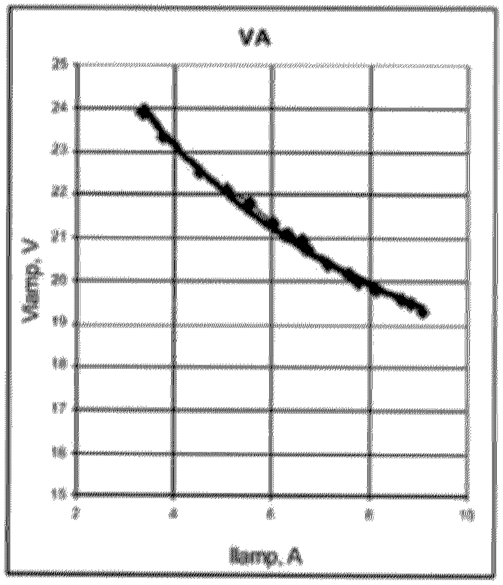
(c)
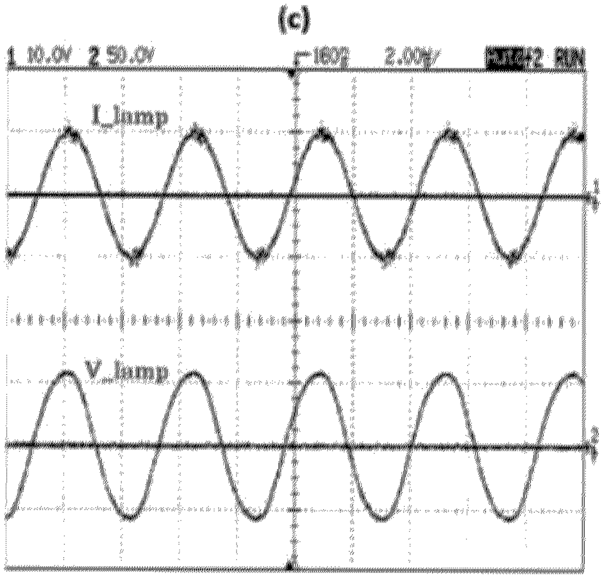
Lamp current (upper traces and voltage (lower traces) for the ICETRON/ENDURA 150W; Drive frequency: 228kHz 7.119A/20.9V;
(b)
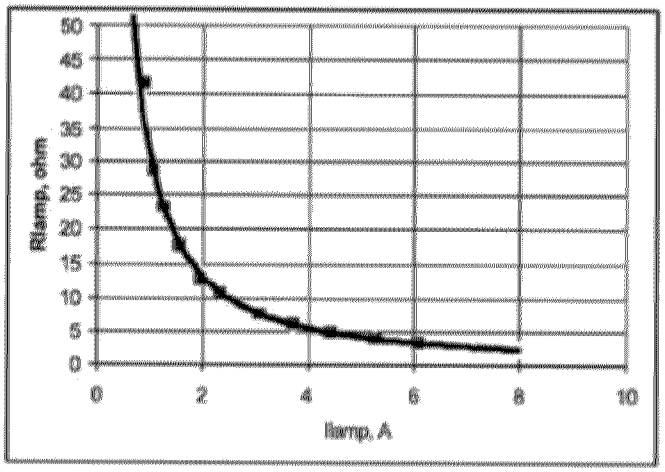
Experimental curve fitting of the ICETRON/ENDURA 150W. (a) V-A curve. (b) Req.
FIG 16

ELECTRODELESS PLASMA DEVICE

CROSS-REFERENCE TO RELATED APPLICATIONS

This application claims the benefit of priority to U.S. provisional patent application Ser. No. 63/043,938 entitled "ELECTRODELESS LIGHT-EMITTING DEVICE" filed Jun. 25, 2020, hereby incorporated by reference in its entirety.

FIELD OF THE INVENTION

The present invention relates generally to plasma devices, discharge reactors, and electrodeless induction lamps. More particularity, this invention relates to devices having a gas-containing envelope able to emit radiation in response to injection of an electrical signal supplied by a radio frequency power source, inducing circulation of a discharge current in such envelope, and to the shape of this envelope.

BACKGROUND

Plasma-based electrodeless induction lamps are known since the 1960s, however lamps of the prior art suffer from several shortcomings.

For example, prior art lamps have emission profiles that are typically limited in that they only radiate outwardly in a radial direction from the discharge tube's axis. They also suffer from various losses. For example, as the discharge volume increases, radiations directed inwardly are trapped and absorbed in the discharge volume. These photons don't reach the lamp's surface and are absorbed and re-emitted many times before reaching the wall of the discharge tube, where they provide useful emissions. They also typically offer a limited exchange at the discharge tube's wall where (+) mercury ions drift and are neutralized by electrons, to diffuse back as mercury atoms inside the discharge volume (ambipolar diffusion). Additionally, the increased ambipolar length in larger discharge tubes, or the distance traveled in a radial direction by mercury ions and atoms, decreases the electron temperature, leading to a lower discharge intensity and lamp efficiency.

Prior art devices also typically suffer from offering limited possibilities for optimizing the discharge envelope, and therefore the lamp's efficiency. Similarly, they provide for limited control of operation parameters, such as lamp current density, internal discharge temperature, embedded lamp voltage gradient monitoring and ignition assistance.

Non-Cylindrical Discharge Tubes (NCDT) of the prior art can increase the radiation emitted compared to cylindrical discharge tubes (CDT) in equivalent conditions. For a given current intensity in discharge tubes of equivalent sections, more photons are able to reach the outer wall of a NCDT compared to a CDT, where plasma emits radially from its circumference.

However, the prior art NCDT lamps use metal electrodes which can be coated with an electronic emission enhancement coating called thermionic coating. However, when electrodes are used with a discharge lamp, they can lead to failure of the lamp and reduction in efficiency, because lamp electrodes have a finite life and suffer from erosion leading to the failure of the device.

Every time such a lamp is turned on, a fraction of the thermionic coating and of the electrodes evaporates and sputters a film onto the inner wall of the discharge tube. A film builds up gradually and reduces the transmission of radiation. While the thermionic coating protects the electrodes and increase the lamp efficiency, as it wears out, the metal electrodes are left exposed and eventually fail, disabling operation of the lamp permanently. The use of electrodes also limits the maximum current intensity that is able to flow in the discharge lamp, the radiation power, and the maximum discharge temperature.

There is thus a need for improved electrodeless light-emitting devices and reactors which overcome limitations of the prior art, provide more powerful emissions, and enable the operation of electrodeless devices at a substantially wider operating power span and temperature range, with an increased efficiency and a longer life compared to prior art devices.

There is also a need for an improved plasma discharge tube with a more efficient envelope shape, for use in electrodeless light-emitting devices and reactors.

This background information is provided to reveal information believed by the applicant to be of possible relevance to the present invention. No admission is necessarily intended, nor should be construed, that any of the preceding information constitutes prior art against the present invention.

SUMMARY

The herein disclosed invention aims to address at least the above discussed shortcomings of the prior art, and to provide a more efficient and durable plasma device for applications including light emission.

In an embodiment, an electrodeless plasma device, which can operate as a light-emitting device, can have a closed loop tubular discharge assembly which is made of one or more tubular segments. These segments are tubularly connected at their respective ends, such that the closed loop assembly hermetically encloses an ionizable gas. At least one of the one or more tubular segments has an internal tube at least partially enclosed within an external tube, in a coaxial configuration, so as to form a hollow-shaped discharge envelope. The envelope thus encloses the ionizable gas between the internal tube and the external tube. When a discharge current circulates in the ionizable gas of the envelope, a hollow-shaped plasma can be created in the envelope, surrounding the internal tube.

For operation of an electrodeless plasma or light-emitting device in accordance to an embodiment, an electromagnetic coupler can be placed around a portion of the closed loop tubular discharge assembly. Upon being powered by a radio frequency (RF) power source, the coupler induces a discharge inside the assembly.

A segment of the closed loop tubular discharge assembly may have a cylindrically shaped discharge tube. This cylindrically shaped discharge tube is tubularly connected to the end of the segment comprising the hollow-shaped discharge envelope, to form a transition zone. The transition zone of the assembly defines a transition discharge envelope with a cross-section passing from non-hollow to hollow, or vice-versa, along a path length of the discharge assembly.

In some embodiments, the transition zone may define a transition discharge envelope with a cross-section passing from annular to non-annular, or vice-versa, along the discharge assembly's path length.

A second tubular segment of the closed loop tubular discharge assembly may comprise a second internal tube at least partially enclosed within a second external tube to form a second hollow-shaped discharge envelope enclosing the ionizable gas. Similarly, when the discharge current circulates in the ionizable gas of the second envelope, a second hollow-shaped plasma can be created in the second envelope, surrounding the second internal tube.

A segment of the closed loop tubular discharge assembly may comprise two internal tubes. Each first and second internal tubes can be at least partially enclosed within the same external tube of that segment. In one variation, the second internal tube forms a second hollow-shaped discharge envelope with the external tube of that segment. In another variation, the second internal tube is a coiled internal tube which is wound around the first internal tube; the first internal tube following an axis of the segment.

A segment of the closed loop tubular discharge assembly may comprise an internal tube at least partially enclosed within an external tube, the internal tube extending beyond the external tube, at one of the respective ends of that segment, through an outer wall of the discharge assembly, to form an access port into the internal tube. The access port can be used for inserting objects, fluids or gases. More specific examples are provided in the detailed description.

In some embodiments where a coiled internal tube is used, this coiled internal tube may also extend beyond the external tube, at one of the respective ends of that segment, through an outer wall of the discharge assembly, to similarly form a second access port into the coiled internal tube. Such an opening may also allow for the introduction of objects, fluids or gases. In such embodiments, the inside of the coiled internal tube and the internal tube each form respectively a coiled and an elongated reaction chamber. During operation, the objects, fluids or gases introduced into the internal tubes undergo radiation treatment.

In another embodiment, an electrodeless plasma device, which can operate as a light-emitting device, comprises a discharge vessel enclosing a gaseous substance, the gaseous substance being ionizable by electromagnetic excitation means, thereby inducing circulation of a discharge current in the discharge vessel. The discharge vessel comprises a non-cylindrical, hollow shaped discharge envelope. When the discharge current circulates in the non-cylindrical, hollow shaped discharge envelope, a hollow-shaped plasma is created therein.

The discharge vessel may further comprise a cylindrically shaped discharge envelope tubularly connected with the non-cylindrical, hollow-shaped discharge envelope, to form a transition zone. The transition zone of the vessel defines a transition discharge envelope with a cross-section passing from non-hollow to hollow, or vice-versa, along the discharge vessel's path length.

In some embodiments, the transition zone may define a transition discharge envelope with a cross-section passing from annular to non-annular, or vice-versa, along the discharge vessel's path length.

In some embodiments, the non-cylindrical, hollow shaped envelope is formed by a tubular segment at least partially enclosing an internal segment in coaxial configuration. The internal segment may be a tube or a rod, for example.

Alternatively, the discharge vessel may comprise a first internal tube at least partially enclosed within an external tube to form the non-cylindrical, hollow-shaped discharge envelope. In some embodiments, a second internal tube may be enclosed within the external tube. In some embodiments, the second internal tube is coiled around the first internal tube. In some embodiments, the first and/or second internal tubes may extend beyond the external tube, through an outer wall of the discharge vessel, to form respective access ports into the first and/or second internal tubes.

In some embodiments, an access port may provide access to the inside of either the first or second internal tubes, or both, which are exposed to radiation being emitted through their respective walls. In some embodiments, the access port may be used for inserting objects, fluids, gases, or a combination thereof.

In some embodiments, the gas is ionizable to emit ultraviolet radiation for treatment of objects, fluids, gases, or a combination thereof.

In another embodiment, a photon discharge reactor comprises a discharge vessel enclosing a gaseous substance, the gaseous substance being ionizable by an electromagnetic excitation means inducing circulation of a discharge current in the vessel. The discharge vessel comprises a non-cylindrical, hollow-shaped discharge envelope, such that when the discharge current circulates in the non-cylindrical, hollow-shaped discharge envelope, a hollow-shaped plasma is created therein.

The discharge reactor may further comprise a cylindrically shaped discharge envelope tubularly connected with the non-cylindrical, hollow-shaped discharge envelope, to form a transition zone. The transition zone of the vessel defines a transition discharge envelope with a cross-section passing from non-hollow to hollow, or vice-versa, along the discharge vessel's path length.

In some embodiments, the transition zone may define a transition discharge envelope with a cross-section passing from annular to non-annular, or vice-versa, along the discharge vessel's path length.

The discharge reactor may comprise a first internal tube at least partially enclosed within an external tube to form the non-cylindrical, hollow-shaped discharge envelope. In some embodiments, a second internal tube may be enclosed within the external tube. In some embodiments, the second internal tube is coiled around the first internal tube. In some embodiments, the first and/or second internal tubes may extend beyond the external tube, through an outer wall of the discharge vessel, to form respective access ports into the first and/or second internal tubes.

In some embodiments, an access port may provide access to a reaction chamber formed by the inside of either the first or second internal tubes, or both, which are exposed to radiation being emitted through their respective walls. In some embodiments, the access port may be used for inserting objects, fluids, gases, or a combination thereof.

An advantage of some embodiments is an increased durability, power, and efficiency compared with prior art devices. Without the use of electrodes, the device can be turned on and off without limiting its life span.

Another advantage of some embodiments is the possibility to introduce elements inside an access port of a discharge vessel or closed loop tubular discharge assembly, for treatment, cleaning, and device control optimization during operation.

The hollow shape of the discharge vessel, in accordance with some embodiments, advantageously enables the ability to more efficiently control a desired size of the discharge envelope, and therefore the plasma during operation. This is especially desirable for optimizing larger plasma devices, light-emitting devices and reactors.

In addition, the herein described electrodeless plasma device, which can operate as a light-emitting device, and reactor can be made from cheaper, lower-grade materials for equivalent efficiency when compared with prior art devices.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further objects, features and advantages will appear from the following detailed description of embodiments, with reference being made to the accompanying drawings, in which:

FIG. 1*a* is a planar 2D schematic view of an electrodeless plasma device and reactor configuration according to an embodiment able to operate as a light-emitting device, with two internal tubes, and four electromagnetic couplers;

FIG. 1*b* is an electrodeless plasma device and reactor of FIG. 1*a*, with two (2) electromagnetic couplers, according to an embodiment;

FIG. 1*c* is an electrodeless plasma device and reactor of FIG. 1*b*, with the two (2) electromagnetic couplers placed around a transition zone of the discharge tube, according to an embodiment;

FIG. 1*d* is an electrodeless plasma device and reactor of FIG. 1*c*, with two (2) internal tubes made thinner at its ends, according to an embodiment;

FIG. 1*e* is an electrodeless plasma light emitting device with the internal tubes entirely enclosed within the external tube, according to an embodiment;

FIG. 1*f* is an electrodeless plasma device and reactor, according to an embodiment where two internal tubes are partially enclosed within the external tube leading out of the device.

FIG. 1*g* is an electrodeless light emitting plasma device, according to an embodiment where two internal tubes are enclosed within the external tube, and each internal tube has an extension having a smaller diameter, leading out the device, according to an embodiment.

FIG. 1*h* is an electrodeless light emitting plasma device and reactor, according to an embodiment where two internal tubes are enclosed within the external tube, and each internal tube further includes an inner coaxial tube leading out of the device, according to an embodiment.

FIG. 1*i* is an electrodeless light emitting plasma device and reactor, according to an embodiment where internal tubes are enclosed within the external tube, some internal tubes further including an inner coaxial tube, and some not, according to an embodiment.

FIG. 1*j* is a hollow enhanced plasma plasmatron reactor, according to an embodiment.

FIG. 15*a* is a graph plotted before ignition of an electrodeless lamp in accordance with prior art (unloaded coupler), while FIG. 15*b* shows the graph after ignition (loaded coupler);

FIG. 16*a* is a graph showing lamp voltage versus lamp current of an electrodeless lamp in accordance with prior art;

FIG. 16*b* is a graph showing lamp resistance versus lamp current of an electrodeless lamp in accordance with prior art; and FIG. 16*c* is an image taken from an oscilloscope measuring lamp voltage and lamp current versus time of an electrodeless lamp in accordance with prior art, with a 2 μs/division time base, according to an embodiment;

Where appropriate and only where similar elements are disclosed and shown in more than one drawing, the same reference numeral will be used to represent such similar elements.

DETAILED DESCRIPTION

The present specification describes an improved electrodeless plasma discharge tube reactor configuration, operative as a light-emitting device. The herein described improved discharge tube can be referred to as a non-cylindrical discharge tube (NCDT).

There are many advantages of using a NCDT. For a given current intensity in the discharge tube of equivalent sections, more photons of a NCDT can reach the wall of the tubular assembly compared to a circular cross-section, or cylindrical discharge tube (CDT) holding a plasma and emitting radially from its circumference. In other words, a NCTD can radiate more light flux and power per unit length of tube than a CDT. However, with circular cross-sectional tubes (e.g. CDT) being more widely available and easy to produce, of lower cost and better mechanical performance than other shapes for a given thickness and material type due to symmetry, NCDT have not been very popular. CDTs are also easier to produce with high-working temperature materials such as quartz or fused silica, which have good transmittance for UV radiations along with good chemical and thermal stability.

A preferred embodiment of the present invention resolves this issue by combining two circular tubes (CDTs) in a coaxial configuration to create an annular shaped discharge vessel; i.e. a NCDT configuration.

In reference to FIG. 1*a* to 1*e*, which show an electrodeless light emitting plasma device and reactor 10 according to an embodiment, a closed loop tubular discharge assembly 11 (also referred to as a discharge tube or vessel) hermetically encloses mercury vapors and other metallic vapors and substance and combination thereof with a buffer gaz. The exact gaseous mix and pressure may vary per application. The assembly content can be excited by one or more radio frequency (RF) transformers or electromagnetic couplers 26 encircling the tubular assembly 11 and coupling therein a RF magnetic field for excitation of a sustained discharge current inside the tubular assembly 11.

Figure 7:
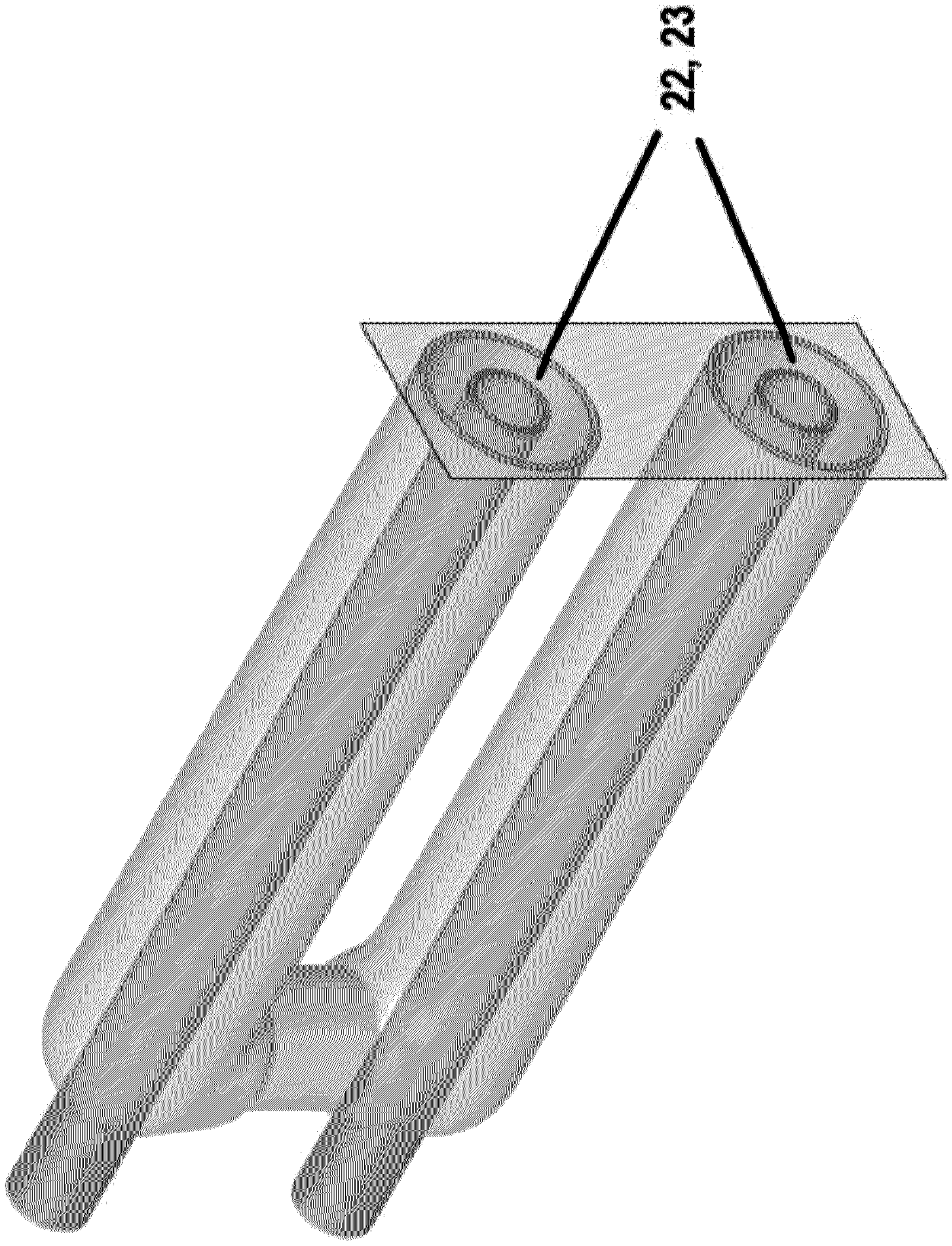
FIG. 7 is the electrodeless light emitting plasma device and reactor of FIG. 5, with a cross-sectional view of the discharge tube shown outside of the transition zone, according to an embodiment.

As shown in the FIG. 1*a* to 1*e*, an assembly 11 can have multiple tubular segments 12, 13, 14, and 15 forming a closed tubular loop. At least one of these segments has an internal segment 18 (and 19) at least partially enclosed within an external tube 20 (and 21), to form a hollow envelope 22 (and 23); or in some embodiments, an annular-shaped tubular envelope, better shown in FIGS. 7-8. As previously mentioned, such a shaped discharge tube is known as a non-cylindrical discharge tube (NCDT). In the figures, internal segments 18 and 19 are shown as tubes. However, they may be elongated segments such as pipes, rods or objects.

Electromagnetic (EM) couplers 26 can be arranged in a variety of ways around the assembly 11, as shown in the figures. Once powered via an RF power source, the coupler can allow ionization of the gaseous substance enclosed within the discharge assembly, which in turn induces circulation of a discharge current therein, creating a hollow-shaped plasma in the hollow-shaped envelope surrounding the internal tube. This plasma emits radiation which can have a variety of wavelengths, depending on the gaseous substance being ionized, gas pressure and temperature, discharge current density as is well known in the art.

Internal tubes 18 and 19 can take a variety of forms. They can be cylindrical tubes; have a circular cross-section along its entire length, or thin out towards its ends, as shown in FIG. 1*d*, or be entirely enclosed inside respective external tubes 20, 21, as shown in FIG. 1*e*.

In an embodiment, an internal tube can be partially enclosed inside an external tube, as in FIG. 1*f*. In another embodiment, an internal tube can be mostly enclosed inside an external tube, except for a smaller extension, having a smaller diameter, leading out of the external tube, as shown in FIG. 1*g*.

In an embodiment, an internal tube that is partially enclosed can further include a coaxial tube allowing a fluid (gas or liquid) to flow from the inner coaxial tube to the outer coaxial tube, or vice versa, all while the fluid remains isolated from the external tube. Such an embodiment is shown in FIG. 1*h*.

In yet another embodiment, there can be some internal tubes having a further inner coaxial tube, and other internal tubes having no inner coaxial tubes. Such an embodiment is shown in FIG. 1*i*. The various inner tubes can be insulated from one another.

In an embodiment, an external tube can have a polygonal geometry and an electromagnetic (EM) coupler 26 can be arranged at each side of the polygon. In FIG. 1*j* for example, an external tube is shaped into an octagon and four electromagnetic (EM) couplers 26 are positioned around four respective sides of the octagon. This particular configuration can be referred to as a hollow plasma enhanced plasmatron plasma reactor.

Any of the internal tubes (18, 19) or objects and external tubes (20, 21) may have a non-circular cross-section, such as rectangular, elliptical, triangular or of an arbitrary shape and combination thereof, which once placed in an embedded, or coaxial configuration, i.e., putting a smaller tube or object inside a larger tube, creates a hollow-shaped tubular envelope there between.

Figure 2:
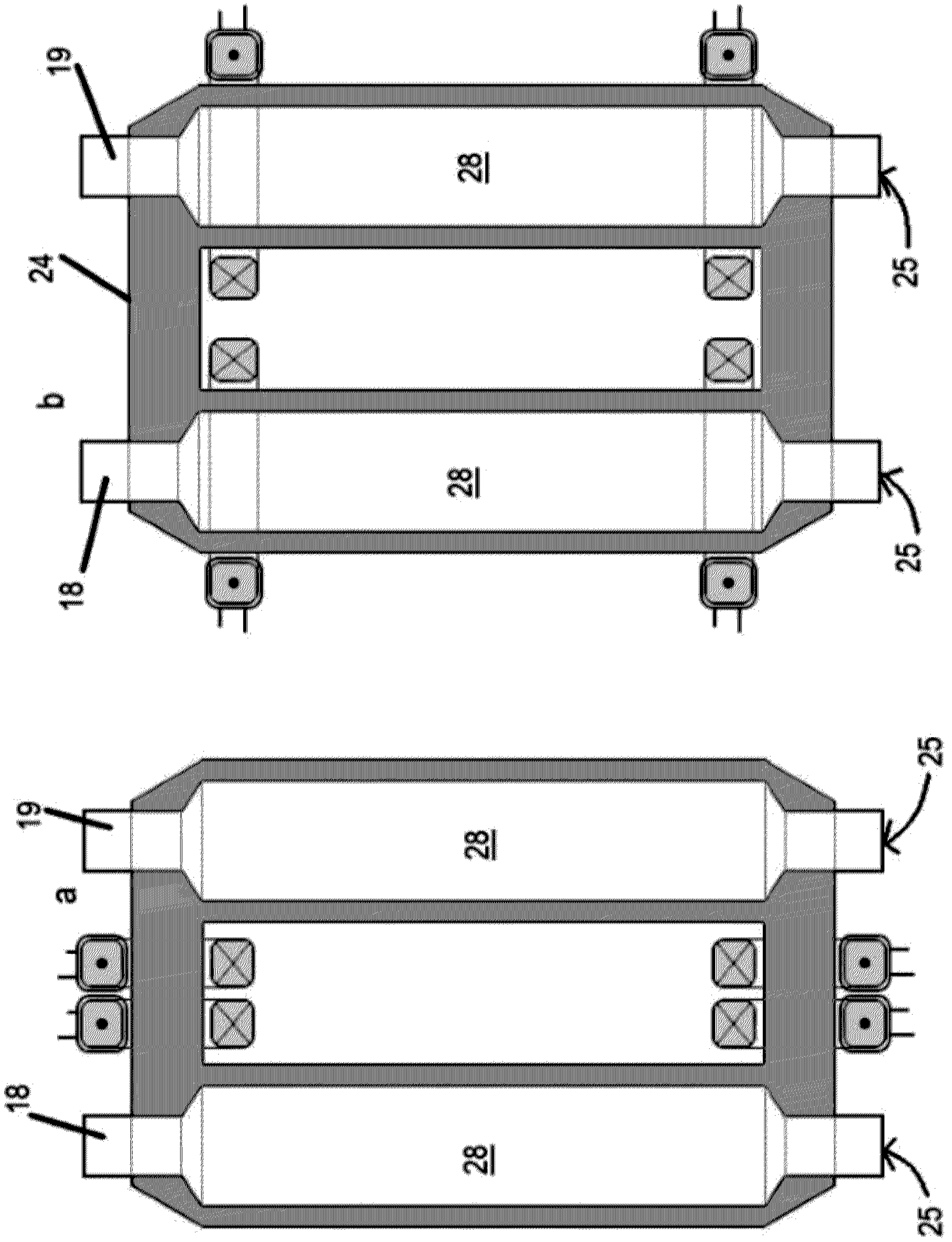
FIG. 2*a* is a planar 2D schematic view of an electrodeless light emitting plasma device and reactor in accordance to another embodiment, with two (2) electromagnetic couplers, and wider shaped internal tubes.
FIG. 2*b* is the electrodeless light emitting plasma device and reactor of FIG. 2*a*, with the four (4) electromagnetic couplers placed at different locations around the discharge tube, according to an embodiment.
Figure 3:
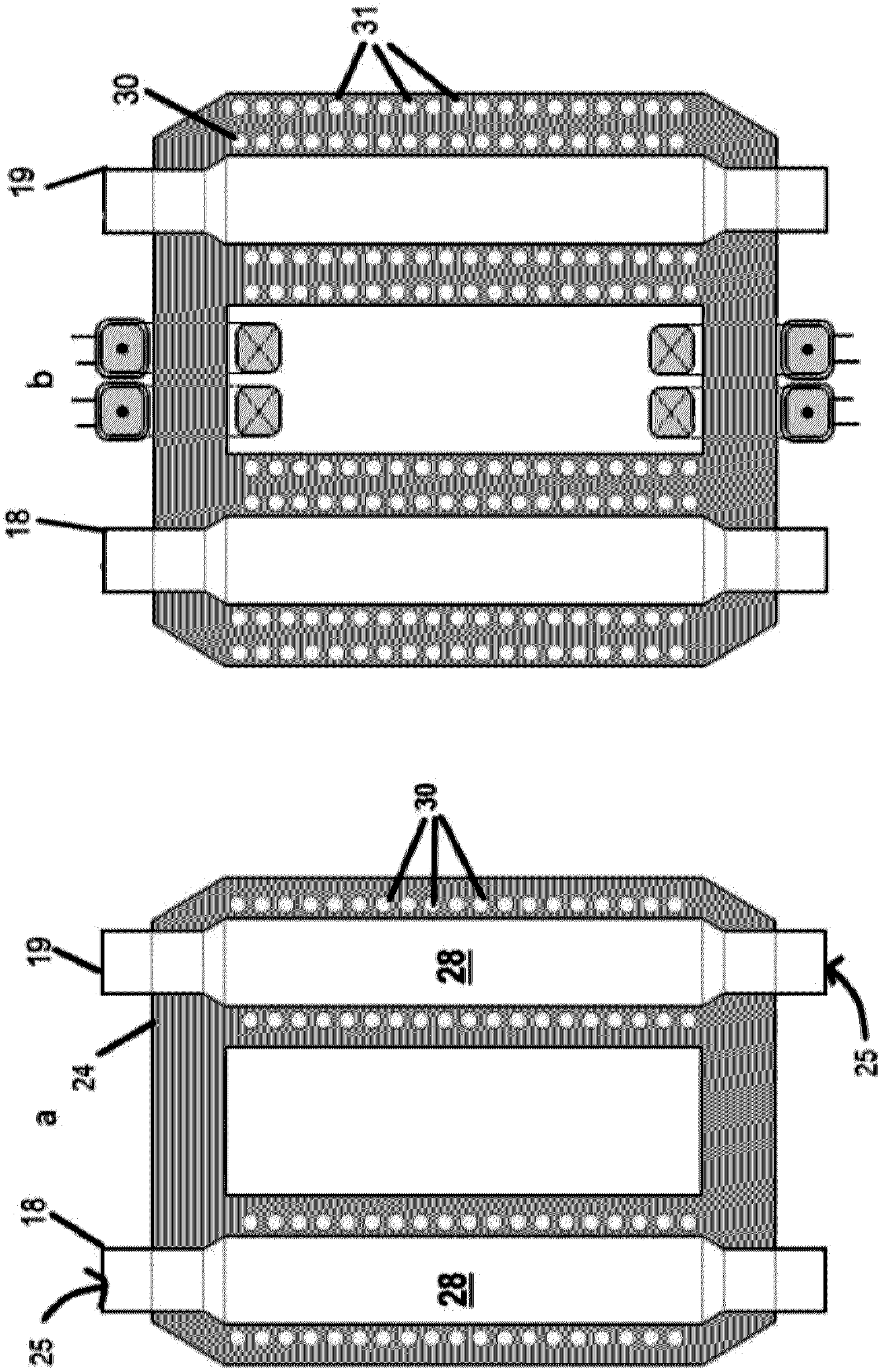
FIG. 3*a* is the electrodeless light emitting plasma device and reactor of FIGS. 2*a* and *b*, shown without the couplers, and with a coiled internal tube wound around each internal tube, according to an embodiment.
FIG. 3*b* is the electrodeless light emitting plasma device and reactor of FIG. 2*a*, with two (2) pairs of coiled internal tubes, each pair being wound around one internal tube, according to an embodiment.
Figure 4:
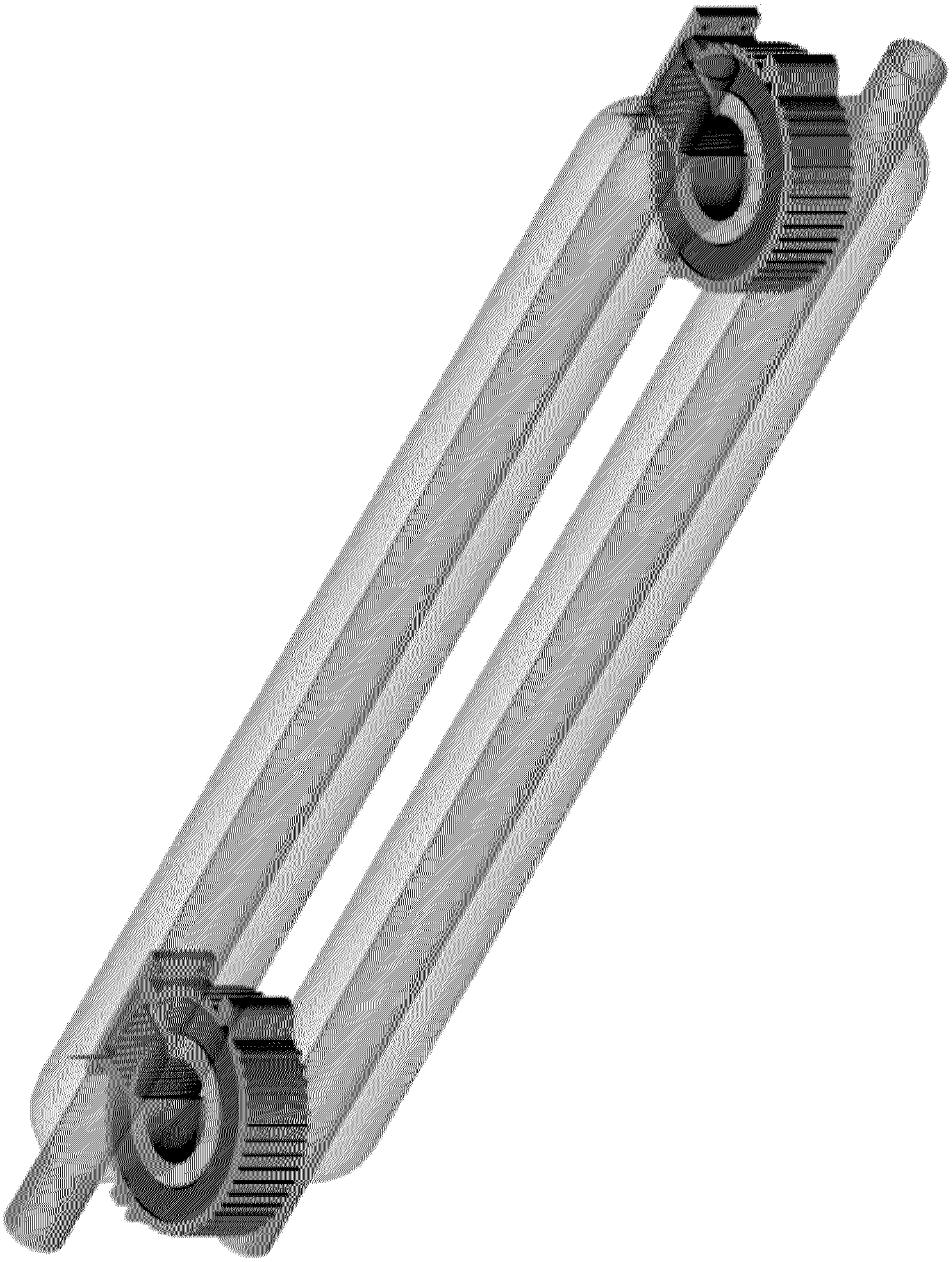
FIG. 4, is a 3D view of an electrodeless light emitting plasma device and reactor in accordance with one embodiment.
Figure 5:
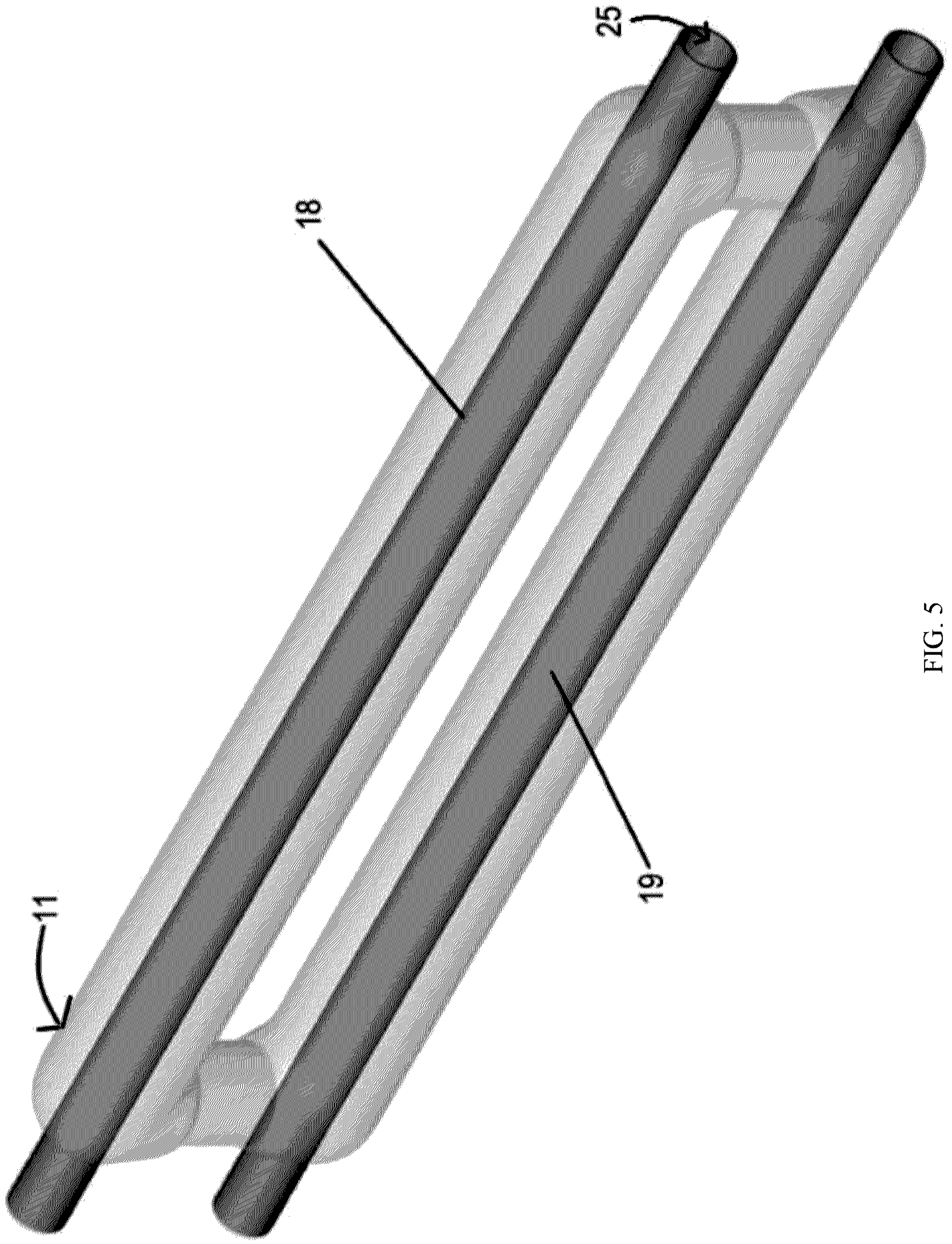
FIG. 5 is the electrodeless light emitting plasma device and reactor of FIG. 4, without the electromagnetic couplers, according to an embodiment.

As detailed above, FIGS. 1*a*-1*d*, 2*a*-*b* and 3*a*-*b* illustrate an embodiment where both ends of the internal tubes (18, 19) extend through the external tubes (20, 21), through the outer wall of the closed-loop tubular vessel assembly 11, at each of its ends. As shown in FIG. 3*a*, the internal tube is welded to the outer wall 24 of the closed-loop tubular vessel assembly such as to leave an open path for the closed-loop discharge vessel. In such an embodiment, an open end of each internal tube (18 or 19) protrude out of the assembly 11, forming a connection or access port 25, giving access to the inside of the internal tube (18 or 19) which forms a reaction chamber 28.

FIGS. 2*a*, 2*b* and 3*a*, 3*b* show a photon discharge reactor configuration where the internal tubes are wider such that the reaction chambers 28 are more spacious; an advantage for certain applications. The ability to increase or decrease the radius of the internal tube, for example, allows optimizing the size and shape of the discharge plasma without the need to adjust the external diameter of the reactor (e.g., its overall size). This ability is useful for applications where the light emitting plasma device and reactor need to operate at higher current densities and temperatures or form a larger volume internal cavity.

Figure 10:
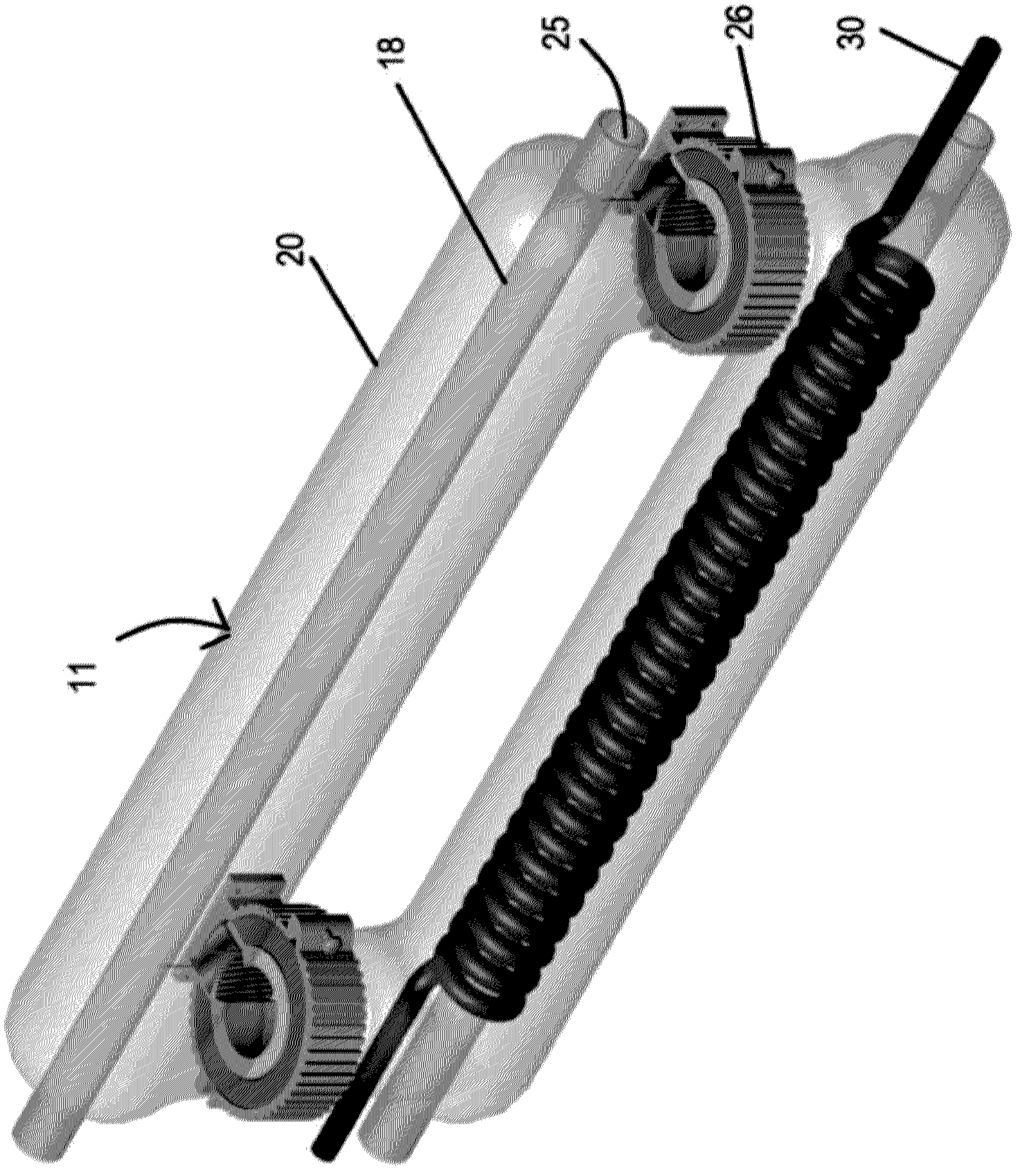
FIG. 10 is a 3D view of an electrodeless light emitting plasma device and reactor in accordance with one embodiment where a coiled internal tube is wound around one internal tube.
Figure 11:
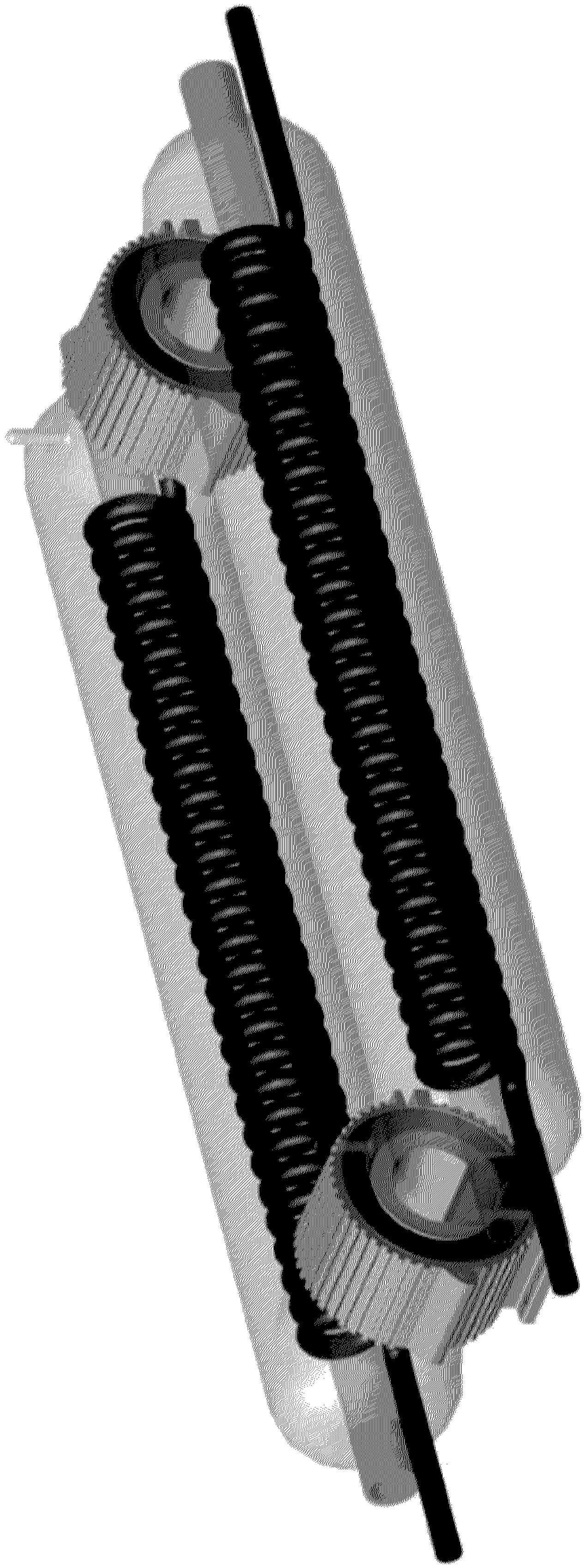
FIG. 11 is the electrodeless light emitting plasma device and reactor of FIG. 10, with an additional coiled internal tube wound around a second internal tube, according to an embodiment.
Figure 12:
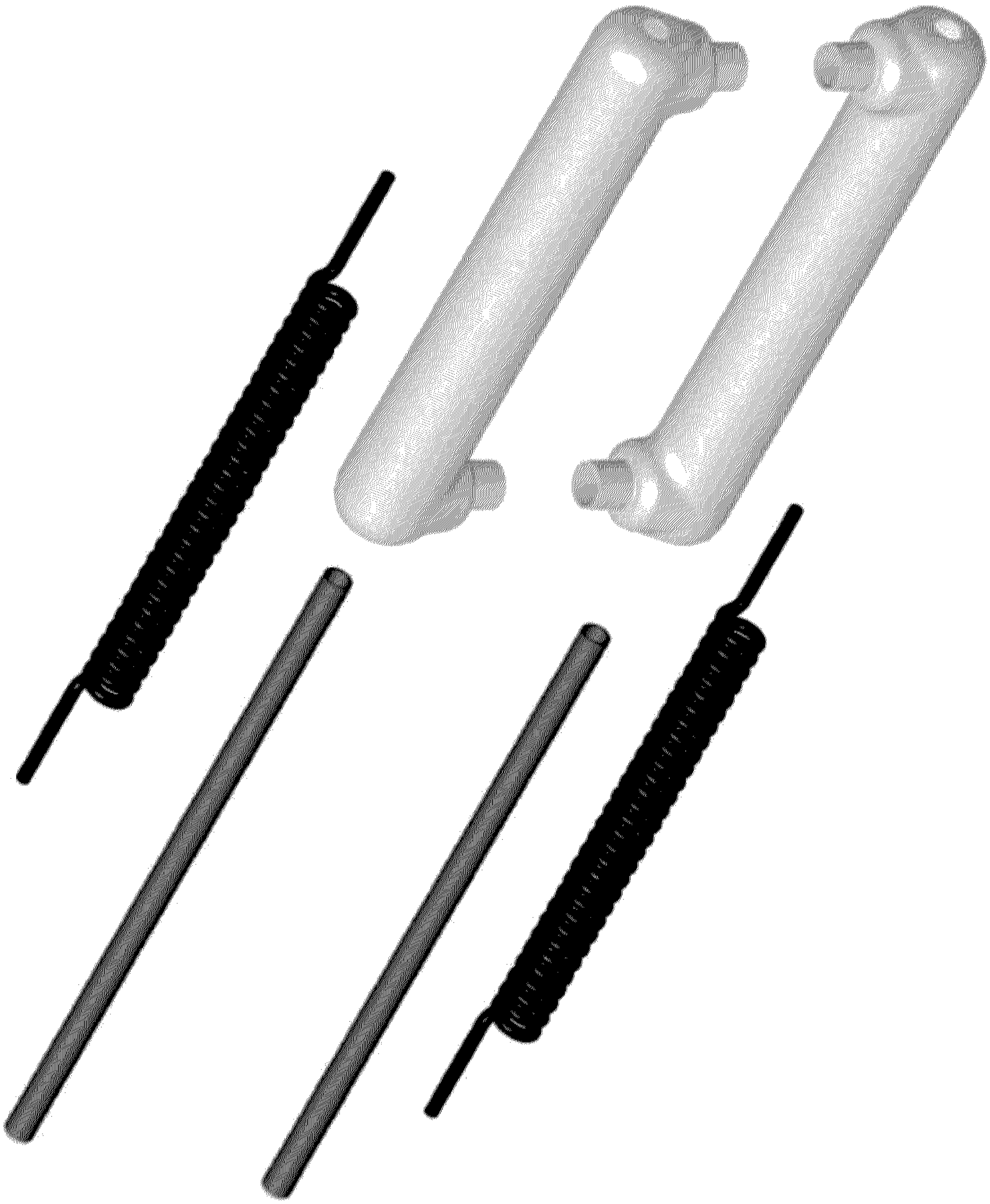
FIG. 12 is a disassembled view of the electrodeless light emitting plasma device and reactor of FIG. 11, according to an embodiment.

FIGS. 3*a* and 3*b* also show the use of optional coiled internal tubes 30 and 31, each wound around an internal tube 18 or 19. Coiled internal tubes 30 are also shown in FIGS. 10-12. A variety of design configurations can be used for such coiled tubing. Their use allows the introduction of fluid or material for radiation treatment.

Additionally, a coiled tube placed directly inside the hollow shaped plasma, between the internal tube 18 (or 19) and external tube 20 (or 21), allow the possibility of limiting use of costly high transmittance material. For example, one may choose to use high transmittance quartz only for the coiled tube if the emissions are for treating fluids being carried inside this coiled tube.

Referring to FIG. 3*b*, two coiled tubes are placed in coaxial configuration with internal tube 18, and with internal tube 19, respectively. It is possible to design the hollow-shaped plasma so as to be centered between coiled internal tube 30 and coiled internal tube 31. In one possible arrangement, only the coiled tubes 30 and 31 are made with high transmittance material. In this way, when fluid flows through the coiled tubes 30 and 31 for ultraviolet radiation treatment, for example, very little residual radiations will stray outside of the assembly.

The use of coiled tubes for radiating liquids can also allow for flow mixing which can be referred to as "Dean flow mixing", whereby the fluid is able to mix transversally to its displacement inside the tube. In this way, even liquids with high densities, or substantially opaque to radiation, may be uniformly treated.

In reference to FIGS. 4 to 8, there is shown an electrodeless light emitting plasma device and reactor in accordance to another embodiment, also allowing light emission applications. During discharge, the envelope of the discharge tube will hold a hollow-shaped plasma enclosed between the outer wall of the internal tube (18, 19) and the inner wall of the external tube (20, 21). In an embodiment where both the internal and external tubes have circular cross-sections, the discharge assembly and thus the discharge plasma can have an annular shape.

Figure 6:
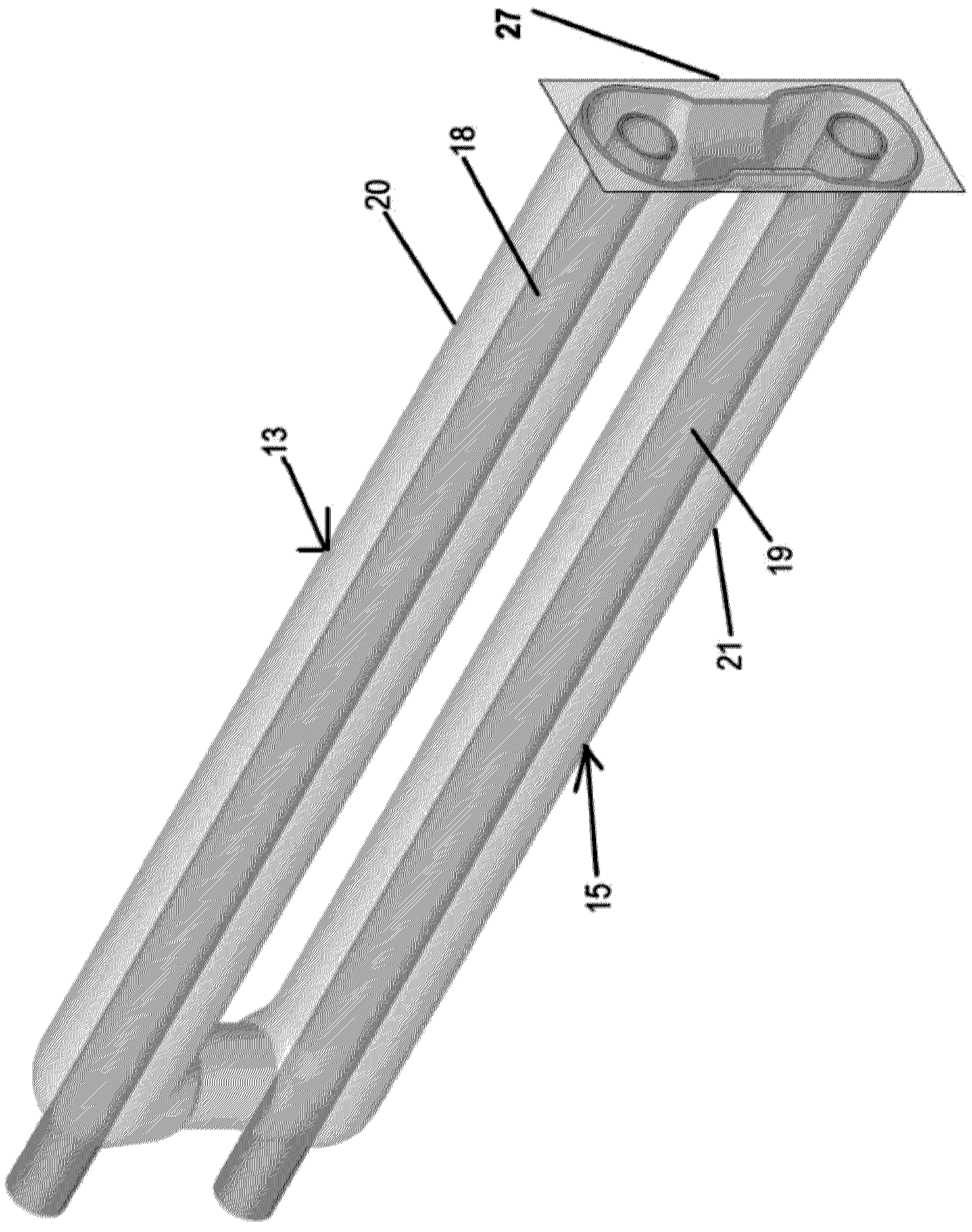
FIG. 6 is the electrodeless light emitting plasma device and reactor of FIG. 5 with a cross-sectional view of the discharge tube shown at one respective end, in a transition zone from non-cylindrical to cylindrical shape, according to an embodiment.
Figure 8:
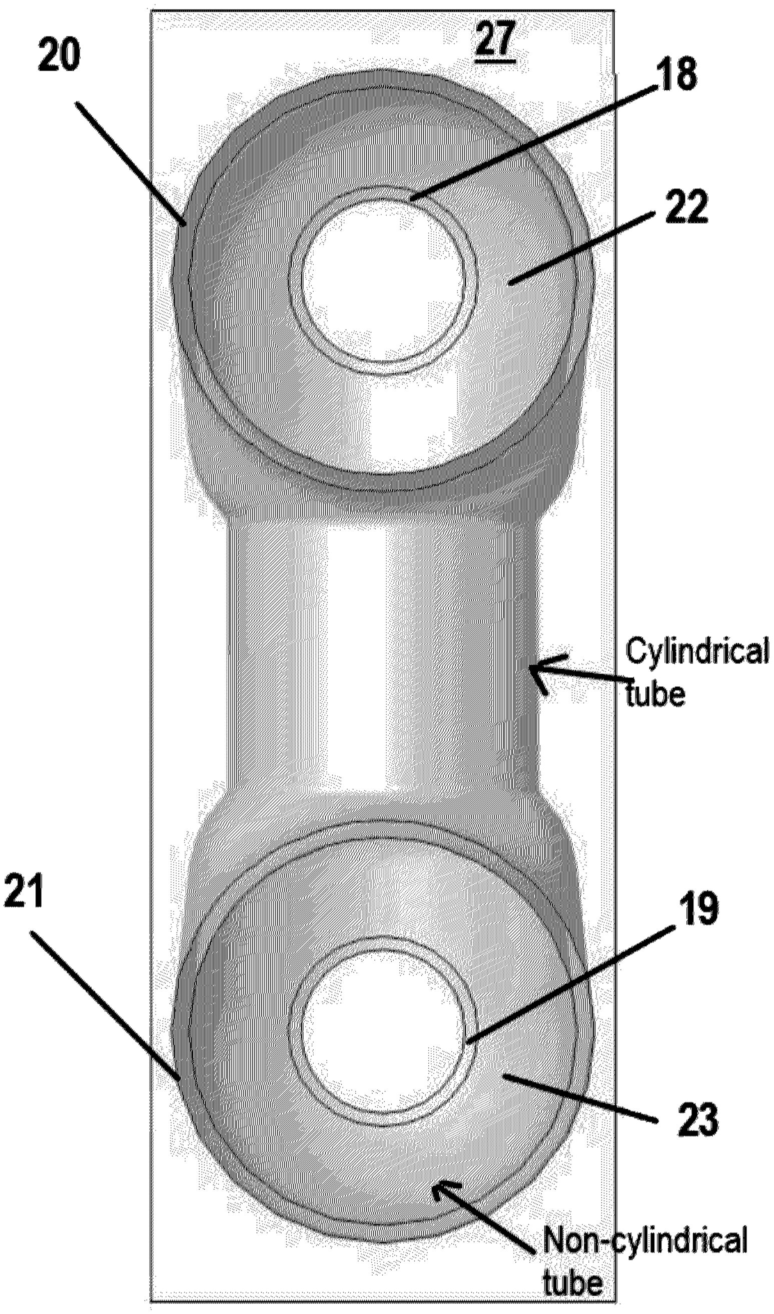
FIG. 8 is the cross-section view of FIG. 7, shown in planar view, according to an embodiment.
Figure 9:
FIG. 9 is a disassembled view of the electrodeless light emitting plasma device and reactor of FIG. 4, according to an embodiment.

FIGS. 6 and 8 show a cross-sectional view of the discharge tube 10 taken at the ends of the coaxial segments, in a transition zone 27, where transition zone can be defined as a change of direction of either an internal tube axis or of the external tube axis, a change in diameter or shape of any of these tubes or a combination thereof. In this transition zone 27, the tube transitions from a hollow, non-cylindrical shape to a cylindrical shape, and back to a hollow, non-cylindrical shape, such that the tube segments are all tubularly connected together to form a closed loop with an inner open path which hermetically holds ionizable gas.

For the first hollow, non-cylindrical tube segment 13, internal tube 18 is enclosed within external tube 20 to form a hollow-shaped discharge envelope 22. For the second hollow, non-cylindrical tube segment 15, internal tube 19 is enclosed within external tube 21 to form a hollow-shaped discharge envelope 23. When the gas is ionized by an electromagnetic excitation means, such as EM couplers 26, an induced discharge current circulates in the gas in the envelope 22 (and 23). This creates a hollow-shaped plasma inside the envelope 22 (and 23), which surrounds the outer wall of the internal tube 18 (and 19), enclosed by the inner wall of the external tube 20 (and 21).

For an embodiment using low pressure mercury vapors in the discharge vessel, this enhanced efficiency of radiation from a hollow-shaped or annular plasma, versus radiation from a plasma in a cylindrical discharge tube, can be explained by the reduced ambipolar diffusion length (ADL) of mercury ions (+) to the wall and increased wall surface (inner tube and outer tube) in an annular plasma compared to the ADL and wall surface in cylindrical discharge tubes. More ions recombine with electrons and return to the discharge zone as neutral mercury atoms in an annular plasma compared to a circular plasma. This enhanced boundary loss of ions in annular plasma increases electron mobility and electron temperature in the discharge. In other words, it provides more ionization and useful excitation of mercury atoms to emit radiations in the band of interest.

In one embodiment, the coaxial tube segments 13 and 15 are made of high transmittance material suitable for substantial transmission of the radiation emitted by the discharge in the vessel, and of low thermal expansion coefficient (TEC) such as quartz or fused silica.

The tubing of the coaxial segments 13 and 15 may optionally be coated with (or coupled to) light-reflective means on one wall of the internal tube or on one wall of the outer tube or both, depending on the preferred operation.

In one embodiment, the internal tube 18 (or 19) can be made of high UV transmittance material such as synthetic quartz or fused silica to allow efficient transmission of the full spectrum of light present in the discharge into the reaction chamber 28. For example, if the vessel of the light-emitting device and reactor holds mercury vapors and a low pressure (P°~300 mTorr) buffer gas, such as argon or a blend of noble gas, both mercury resonance radiations (185 nm and 253.7 nm) can be coupled into the reactor chamber.

In an embodiment where both the internal and external tubes 18 and 20 have circular cross-sections, are in coaxial configuration, and form an annular shaped discharge envelope 22, the operation of an electrodeless plasma device and reactor can be as follows. An annular plasma can be created inside the discharge tube 11, surrounding the internal tube 18 and the radiation from the plasma can be coupled into the reaction chamber 28 through the high transmittance wall of the internal tube 18. The openings 25 of the internal tube 18 can be used for injection and circulation of fluids into the reaction chamber 28 for irradiation or temperature control of the discharge vessel, or both. These openings 25 form access ports to also allow the introduction of objects into the reaction chamber 28. Long objects such as pipes and rods can be introduced for varying applications. For example, they can serve as a photo catalyst substrate, light-reflective means, diffusers for liquid or gas inside the reaction chamber, under high irradiation. Other potential objects include sonotrodes, electrodes, waveguides, wires, fiber optics and a combination thereof.

In one embodiment, internal tube 18 and 19 may be replaced by elongated pipes, rods or objects such that a hollow-shaped envelope is still created in combination with the external tube 20 and 21. In such case, there may not be any access port 25.

Examples of uses of the above described electrodeless light emitting plasma device and reactor include the ability to clean and/or scrub the wall-fluid surface inside the reaction chamber 28 using ultrasounds (US) for maintenance of a high transmittance of radiations from the discharge into the reaction chamber. This can be done while fluid is being processed inside the photoreactor.

In an embodiment, ultrasounds (US) and ultraviolet (UV) radiations can be used simultaneously in a reactor to enable photosonolytic reactions in the fluid. For example, when US are used in conjunction with UV radiations involving both mercury resonance wavelengths 185 nm (UVV) and 253.7 nm (UVC), synergetic photosonolytic reactions are enabled. Such reactions are known to a person skilled in the art for its capability to eliminate or mitigate germs, micropollutants such as PFAS, PFOS, drugs or pesticides, substances known to be emerging contaminants that are difficult to treat and destroy.

Figure 13:
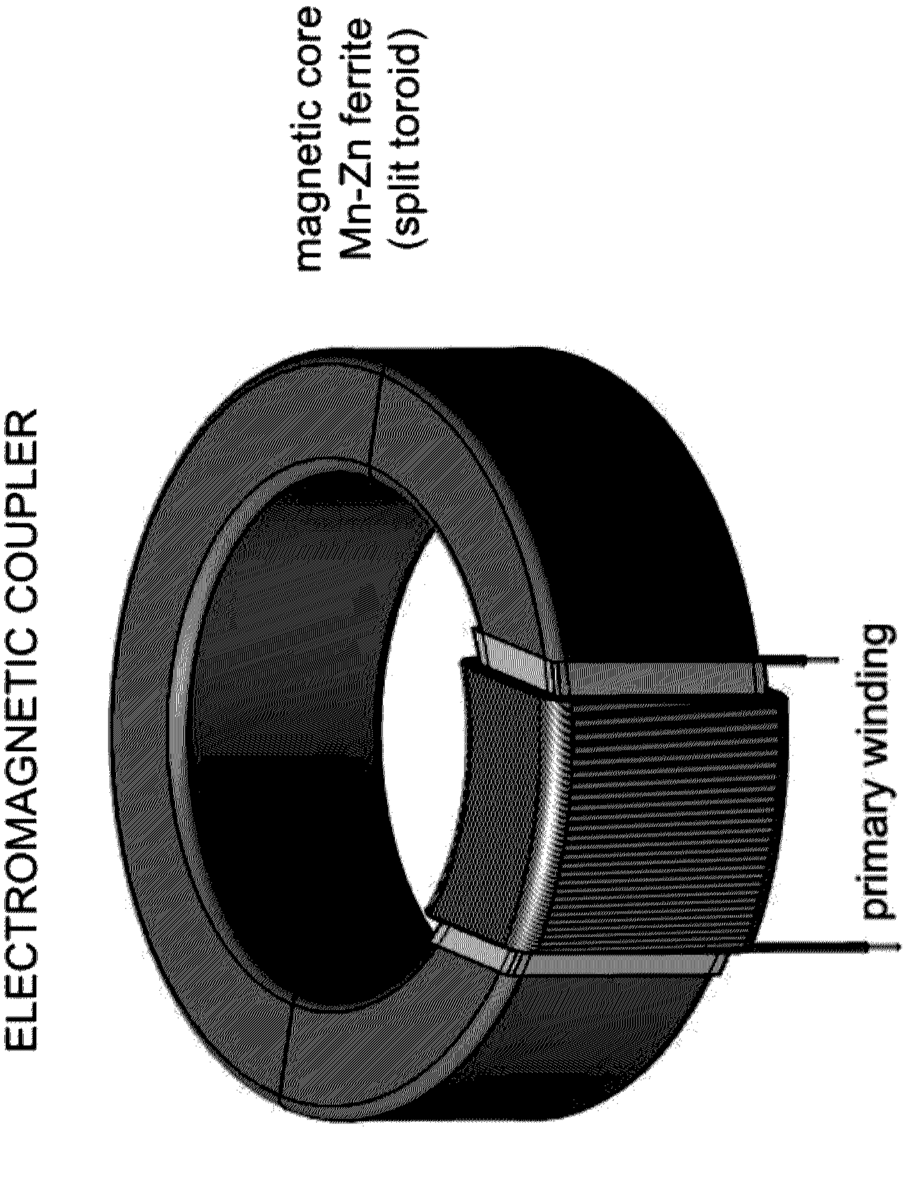
FIG. 13 is an electromagnetic coupler in accordance with one embodiment.

FIG. 13 shows an embodiment of an electromagnetic coupler 26, in this case a ferrite transformer, for use in powering the electrodeless light-emitting device and reactor in accordance with an embodiment. This transformer, in connection with an RF energy source and driving circuit (refer to FIG. 14) can function as an electromagnetic excitation means for the discharge vessel 11.

Figure 14:
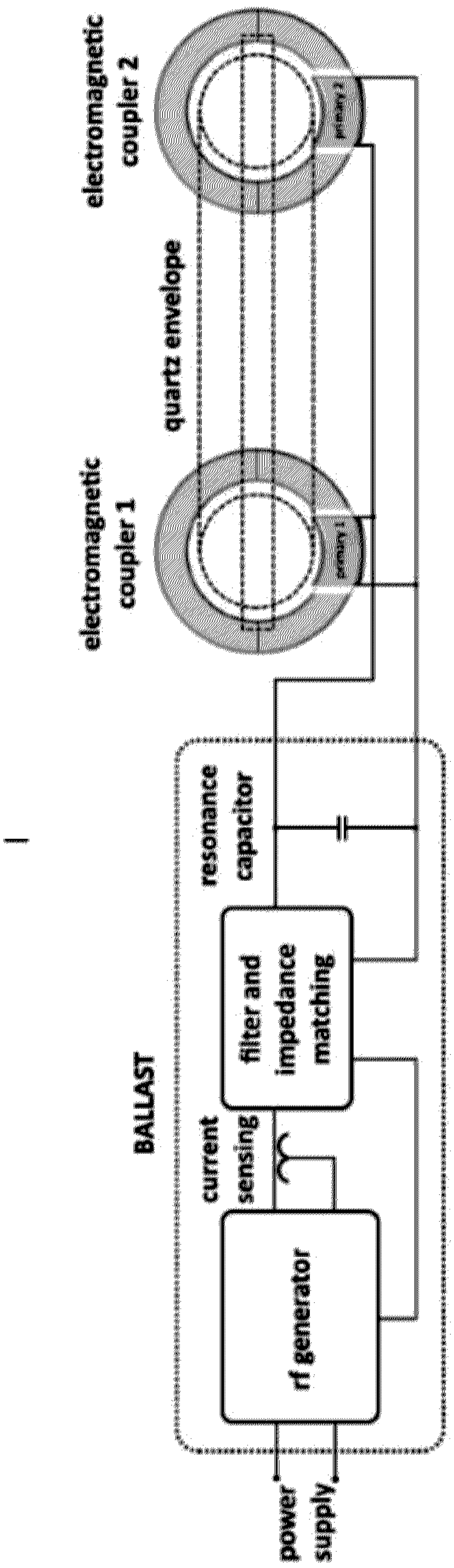
FIG. 14 is a high-level schematic and block diagram of electromagnetic couplers connected to a radio frequency (RF) power source (electronic ballast), for powering the electrodeless plasma device and reactor in accordance with one embodiment.

The above-described electrodeless plasma device and reactor can be powered following a variety of methods, one of which is now described for exemplary purpose, in reference to FIG. 14.

Upon being powered by the radio-frequency (RF) power source via its primary winding, the open circuit electromagnetic (EM) couplers or transformers can enter in resonance with the output circuit of the RF power source. The couplers capacitively couple a first stray RF high electrical field in the vessel causing ionization of the gas enclosed therein. The gas eventually breaks down in the vessel, creating a conductive path, a virtual single turn conductor secondary for the couplers. An electrical load appears and changes the impedance of the equivalent circuit seen by the RF power source. The loaded circuit is no longer in resonance and an RF current begins to circulate in the closed loop discharge assembly (the ionized vessel) via the EM couplers. The electrodeless plasma device is turned-on and inductive coupling of current by the EM couplers in the assembly can sustain a discharge.

Figure 15:
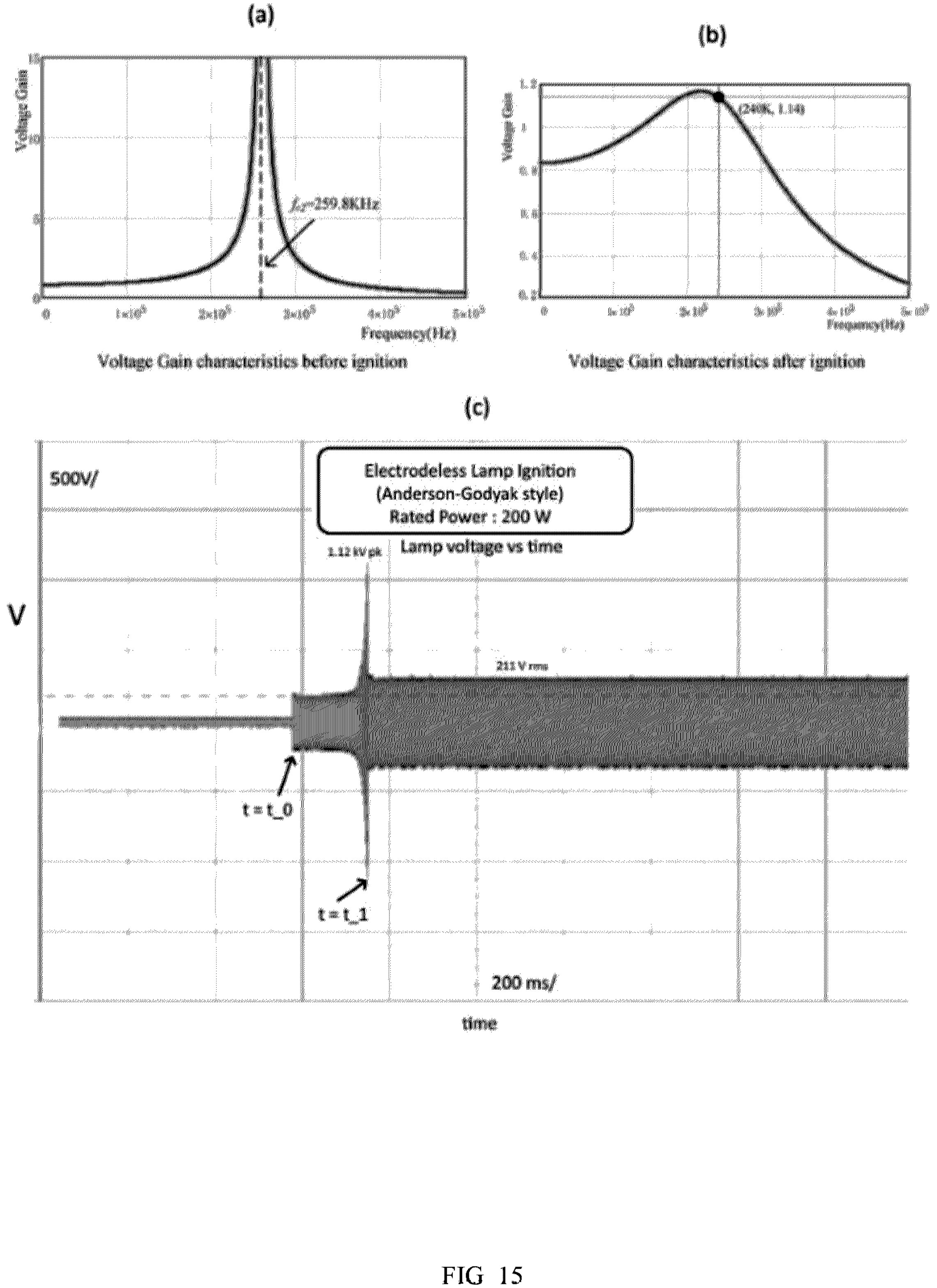
FIGS. 15*a* and 15*b* are both graphs showing a voltage gain of a resonant output circuit versus an RF power source in accordance with prior art.
FIG. 15*c* is an image taken from an oscilloscope measuring lamp voltage versus time during the ignition process of an electrodeless lamp in accordance with prior art.

More specifically, with reference to FIG. 14 and examples taken from operation of prior art device as shown in FIGS. 15-16, the ignition process can be as follows.

Initially, the device enters an electric "E mode" excitation (metastable). When the light-emitting device is first energized at $t=t_0$ (refer FIG. 15*c*), the electromagnetic couplers' virtual secondary are open circuits (the closed-loop discharge vessel is not ionized at this time). In this condition, the RF power source (also referred as an "electronic ballast" in the art) has a little electrical load (refer to FIG. 14). The magnetization inductance of the unloaded (open secondary) electromagnetic couplers enter resonance with a capacitor in the output circuit of the electronic ballast, as shown by the voltage gain graph of the circuit (refer to FIG. 15*a*). The RF generator of the ballast adjusts its frequency so that a peaking RF electric field builds-up in the discharge vessel through capacitive coupling (refer to FIG. 15*c*) from time $t=t_0$ to $t<t_1$, until breakdown of the gas in the vessel at $t=t_1$.

After breakdown of the gas, the device excitation mode switches from electric (E) to magnetic (H). The magnetic (induction) is the steady state excitation mode of the device. Following ionization of the gas in the closed-loop discharge vessel, the high electric field collapses ($E_\downarrow$) at $t>t_1$ (refer to FIG. 15*c*). A conductive path is created in the discharge vessel, and an RF current begins to circulate in the couplers, and hence in the discharge vessel as well due to magnetic induction. The intensity of the RF current rises in the plasma of the light-emitting device due to the negative impedance characteristics of the discharge, as shown on the voltage versus current characteristics figure (refer to FIG. 16*a*). The conductive path in the closed-loop discharge vessel can act as a virtual conductor for the secondary of the couplers. The impedance of the discharge in the closed loop vessel (refer to FIG. 16*b*) is now loading the driver output and the new voltage gain characteristic figure is damped (refer to FIG. 15*b*). The RF current in the discharge vessel sustains the discharge. The ballast circuit controls the intensity of the discharge current in the device. At this point, the plasma device's voltage and current should be closer to steady state operating conditions (refer to FIG. 16*c*).

In an embodiment, an electrodeless plasma device and reactor can handle thermal expansion by having stress buildup in tubes reduced. If a device has low power density and the temperature within a lamp is low to negligible, the coefficient of thermal expansion for quartz can be low (i.e., ~0.55 ppm/° C.) and stress may not be significant. However, in some embodiments, the temperature between an inner and an outer tube of coaxial segments can be over 600° C. If the lamp body of an embodiment is long, expansion of the inner tubing should be considered, and stress buildup mitigated.

FIG. 1*e*-*i* serve to help mitigate stress buildup in MP lamps according to embodiments.

Light emitting plasma devices and reactors according to embodiments can be used for ultraviolet (UV) curing applications of polymer coatings, adhesives, and structural resins for 3D printing, because the enhanced emission spectrum of these lamps can be toward the range of UVA-to-blue wavelengths.

A plasma device and reactor according to embodiments can be used to produce a hollow plasma and configured as a plasmatron plasma chemical reactor, which is a closed loop non-thermal plasma reactor that also uses ferromagnetic inductive discharge (FMID). A plasmatron plasma chemical reactor can be made for direct interaction of the plasma with reactants, surfaces (i.e., cold plasma torch cleaning) and neutral gas in a reaction chamber of the device, in its close vicinity, or a combination thereof. For example, a plasmatron plasma chemical reactor can be used as a cold plasma torch working at atmospheric pressure and be used for cleaning, etching or sterilization of material placed near the reactor.

Figure 17:
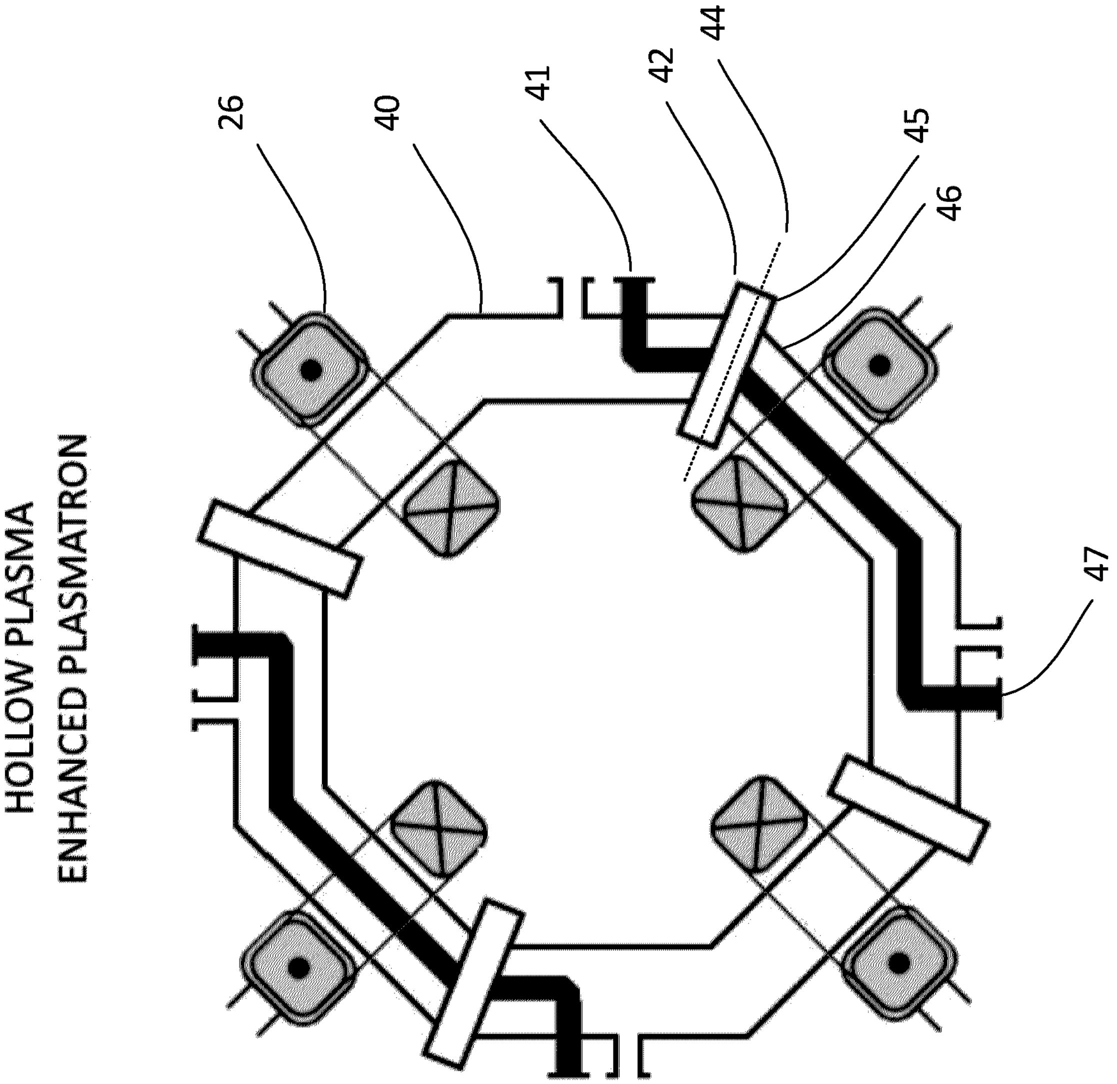
FIG. 17 is a hollow plasma enhanced plasmatron plasma reactor, according to an embodiment.

FIG. 17 shows a hollow plasma enhanced plasmatron, according to an embodiment with an octagonal geometry. An electromagnetic (EM) coupler 26 can be arranged at each side of the octagon. In FIG. 1*j* for example, an external tube is shaped into an octagon and four electromagnetic (EM) couplers 26 are positioned around four respective sides of the octagon. This particular configuration can be referred to as a hollow plasma enhanced plasmatron. Plasmatron envelopes are frequently made of stainless steel or other conductive metal. In such cases, each segment may be encircled by an electromagnetic coupler 26 such as segments 40 and 46 in FIG. 17. Segments 40 and 44 must also be isolated from one another by a dielectric spacer 44 to avoid circulation of currents in the metal envelopes as shown for example between the flanges 42 of the segments. The isolation of coaxial metallic internal tube segments between electromagnetic couplers 26 of the enhanced plasmatron of FIG. 17 is also recommended for the reasons of good practice and safety.

In another application, a plasma device and reactor according to embodiments can be used to produce a hollow plasma for implementing an atmospheric plasma torch.

A plasma chemical reactor configured from a plasma device and reactor according to embodiments can be used for the synthesis of materials such as nanopowders used for coatings, synthetic quartz preform powders for pure or doped fiber optics as used in fiber lasers and telecommunication fiber amplifiers.

A plasma chemical reactor configured from plasma device and reactor according to embodiments can also be used for the production of hydrogen from methane (CH4) and carbon dioxide (CO2) and for the recycling of waste gas from oil refineries into the production of methanol.

A plasma device and reactor according to embodiments can enable the injection of reactants or other products in the reaction chamber of a plasmatron at the optimum location for maximum efficiency and yield. For example, embodiments can produce radiation in a range including 185 nm, the range of UV-C, and the range of UVV, any of which can potentially be used for the sterilization of prions. A plasma device and reactor according to embodiments can be optimized as a photonic blasting reactor for a range of radiation around 185 nm, the range of UV-C, and the range of UVV. Further, a combination of such reactors, each one according to an embodiment, can enable cold plasma etch at atmospheric pressure and such a combination can be configured to be a unit.

While the principles of the above described electrodeless plasma device and reactor have been described in connection with specific embodiments, it should be understood that the details of the described embodiments are made only for illustrative purpose and are by no means limiting. Instead, all variations that fall within the range of the claims are intended to be encompassed therein.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to include a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A closed loop tubular discharge assembly for an electrodeless plasma device, comprising:

one or more tubular segments tubularly connected at their respective ends to form the closed loop tubular assembly, hermetically enclosing an ionizable gas;

at least one of the one or more tubular segments comprising an internal tube at least partially enclosed within an external tube, thereby forming a hollow-shaped discharge envelope enclosing the ionizable gas between the internal tube and the external tube; and wherein when a discharge current circulates in the ionizable gas of the envelope, a hollow-shaped plasma is created in the envelope, surrounding the internal tube.

2. The assembly of claim 1, wherein a second one of the one or more tubular segments comprises a second internal tube at least partially enclosed within a second external tube, thereby forming a second hollow shaped discharge envelope enclosing the ionizable gas between the second internal tube and the second external tube; and wherein when the discharge current circulates in the ionizable gas of the second envelope, a second hollow-shaped plasma is created in the second envelope, surrounding the second internal tube.

3. The assembly of claim 1, comprising a second internal tube at least partially enclosed within the external tube.

4. The assembly of claim 1, wherein the internal tube extends beyond the external tube, at one of the respective ends of the at least one tubular segment, through an outer wall of the discharge tube, thereby forming an access port into the internal tube, the access port for inserting one of an object or a fluid.

5. The assembly of claim 1, further comprising an electromagnetic coupler around a portion of the assembly; the coupler, once powered by a radio frequency power source, inducing flow of the discharge current inside the assembly.

6. An electrodeless light emitting device comprising:

a discharge vessel hermetically enclosing a gaseous substance, the gaseous substance being ionizable by an electromagnetic excitation means, thereby inducing circulation of a discharge current in the high light transmittance vessel, the discharge vessel comprising a non-cylindrical, hollow shaped envelope, wherein the non-cylindrical, hollow shaped envelope comprises a tubular segment at least partially enclosing an internal segment, the internal segment comprising one of a tube and a rod; and wherein:

when the discharge current circulates in the non-cylindrical, hollow shaped envelope, a hollow-shaped plasma is created therein, and the tubular segment at least partially encloses the internal segment in a coaxial configuration.

7. An electrodeless light emitting device comprising:

a discharge vessel hermetically enclosing a gaseous substance, the gaseous substance being ionizable by an electromagnetic excitation means, thereby inducing circulation of a discharge current in the high light transmittance vessel, the discharge vessel comprising a non-cylindrical, hollow shaped envelope, wherein the non-cylindrical, hollow shaped envelope comprises a tubular segment at least partially enclosing an internal segment, the internal segment comprising one of a tube and a rod; and wherein:

when the discharge current circulates in the non-cylindrical, hollow shaped envelope, a hollow-shaped plasma is created therein, and wherein the discharge vessel further comprises a cylindrically shaped envelope tubularly connected with the non-cylindrical, hollow shaped envelope, thereby forming a transition discharge envelope with a cross-section passing from non-hollow to hollow or vice versa, or the cross section changing from a hollow shape or a hollow, along a path length of the discharge vessel.

* * * * *